(12) United States Patent
Smith

(10) Patent No.: US 6,428,026 B1
(45) Date of Patent: Aug. 6, 2002

(54) STAGGERED INDEPENDENT SUSPENSION

(75) Inventor: E. Dallas Smith, Greencastle, IN (US)

(73) Assignee: Dallas Smith Corporation, Greencastle, IN (US)

(*) Notice: Subject to any disclaimer, the term of this patent is extended or adjusted under 35 U.S.C. 154(b) by 0 days.

(21) Appl. No.: 09/654,584

(22) Filed: Sep. 1, 2000

Related U.S. Application Data

(60) Provisional application No. 60/151,997, filed on Sep. 1, 1999.

(51) Int. Cl.[7] .................................................. B60G 7/00
(52) U.S. Cl. ...................... 280/124.125; 180/21; 180/22; 180/24.03; 280/5.514; 280/149.2; 280/124.109; 280/124.128; 280/789
(58) Field of Search .................. 180/21, 22, 24.03; 280/5.5, 5.514, 5.515, 124.1, 124.109, 124.11, 124.128, 124.153, 789, 149.2, 124.125

(56) References Cited

U.S. PATENT DOCUMENTS

| | | | |
|---|---|---|---|
| 844,615 A | * 2/1907 | Palmer | |
| 889,960 A | * 6/1908 | Palmer | |
| 1,833,053 A | 11/1931 | McManus | |
| 1,857,249 A | 5/1932 | Marcum | |
| 1,902,712 A | 3/1933 | Leipert | |
| 1,930,208 A | 10/1933 | Marcum | 280/104 |
| 1,940,914 A | 12/1933 | Marcum | 280/104 |
| 1,981,593 A | 11/1934 | Fageol | 180/22 |
| 2,121,862 A | 6/1938 | Dodge | 280/81 |
| 2,172,173 A | 9/1939 | Peterman | 280/124 |
| 2,194,199 A | 3/1940 | Ash | 280/124 |
| 2,194,323 A | 3/1940 | Peterman | 280/81 |
| 2,208,601 A | 7/1940 | Ronning | 280/87 |
| 2,217,817 A | 10/1940 | Ronning | 280/87 |
| 2,226,100 A | 12/1940 | Larison | 280/124 |
| 2,236,695 A | 4/1941 | Peterman | 280/81 |
| 2,239,849 A | 4/1941 | Judd | 280/81 |
| 2,270,022 A | 1/1942 | Price | 280/124 |
| 2,349,289 A | 5/1944 | Larison | 280/124 |
| 2,386,988 A | 10/1945 | Sullivan | 280/104.5 |
| 2,395,640 A | 2/1946 | Pearson | 280/81 |
| 2,411,885 A | 12/1946 | Larison | 280/104.5 |
| 2,507,980 A | 5/1950 | Knapp | 280/124 |
| 2,612,387 A | 9/1952 | Ronning | 280/104.5 |
| 3,078,104 A | 2/1963 | Chalmers | 280/124 |
| 3,345,104 A | * 10/1967 | Ulicki | |
| 3,704,898 A | 12/1972 | Schmidt | 280/124 R |
| 3,713,665 A | 1/1973 | Gouirand | 280/124 F |
| 3,884,502 A | 5/1975 | Wagner | 280/423 |

(List continued on next page.)

FOREIGN PATENT DOCUMENTS

| | | |
|---|---|---|
| DE | 467309 | 10/1928 |
| DE | 654482 | 12/1937 |
| FR | 571499 | 5/1924 |
| FR | 778246 | 3/1935 |
| FR | 1385600 | 12/1963 |
| GB | 881196 | 11/1961 |
| SU | 1213625 | 9/1986 |
| WO | WO 94/01988 | 1/1994 |

*Primary Examiner*—Eric Culbreth
(74) *Attorney, Agent, or Firm*—Woodard, Emhardt, Naughton, Moriarty & McNett

(57) ABSTRACT

A wheel suspension system for a vehicle such as a truck trailer. Wheels of the suspension system are attached to stub axles supported by pivoting trailing arm wheel supports. The wheel supports are arranged on a sub-frame which can be slidingly coupled to the underneath of the trailer. Each wheel support is urged apart from the sub-frame by a spring such as an air spring. In one embodiment the air springs are pressurized under the control of an electronic controller. The rotational axes of the wheels are staggered or spaced apart, such that the rotational axes of the wheels on one side of the sub-frame are not coincident with the rotational axes of the wheels on the other side of the sub-frame.

15 Claims, 6 Drawing Sheets

U.S. PATENT DOCUMENTS

| | | | |
|---|---|---|---|
| 3,961,826 A | 6/1976 | Sweet et al. | 301/125 |
| 4,047,736 A | 9/1977 | Prive | 280/683 |
| 4,061,353 A * | 12/1977 | Kingman et al. | |
| 4,114,712 A * | 9/1978 | Finta | 180/21 |
| 4,252,340 A | 2/1981 | Egging | 280/682 |
| 4,483,546 A | 11/1984 | Brearley | 280/6 R |
| 4,558,886 A | 12/1985 | Straub | 280/711 |
| 4,593,930 A | 6/1986 | Davis | 280/690 |
| 4,619,578 A | 10/1986 | Routledge | 414/498 |
| 4,630,840 A | 12/1986 | Masuda et al. | 280/707 |
| 4,736,958 A | 4/1988 | Armstrong | 280/6 R |
| 4,878,691 A | 11/1989 | Cooper et al. | |
| 4,903,209 A | 2/1990 | Kaneko | 364/424.05 |
| 4,934,733 A | 6/1990 | Smith et al. | |
| 5,016,912 A | 5/1991 | Smith et al. | |
| 5,052,713 A | 10/1991 | Carey et al. | 280/711 |
| 5,275,430 A | 1/1994 | Smith | |
| 5,375,880 A | 12/1994 | Fleener et al. | 280/772 |
| 5,409,069 A | 4/1995 | Hake | 172/400 |
| 5,720,489 A * | 2/1998 | Pierce et al. | 280/149.2 |
| 5,839,750 A * | 11/1998 | Smith | 280/683 |

* cited by examiner

STAGGERED INDEPENDENT SUSPENSION

CROSS-REFERENCE TO RELATED APPLICATIONS

This application claims priority to U.S. Provisional Patent Application Ser. No. 60/151,997, filed Sep. 1, 1999, and incorporated herein by reference.

FIELD OF THE INVENTION

The present invention relates to suspensions for vehicles. More particularly, the present invention relates to independent suspensions particularly useful for truck trailers. The inventions described in my other patents, namely U.S. Pat. No. 4,878,691, issued on Nov. 7, 1989; U.S. Pat. No. 4,934,733, issued on Jun. 19, 1990; U.S. Pat. No. 5,016,912, issued on May 21, 1991; and U.S. Pat. No. 5,275,430, issued on Jan. 4, 1994; are all incorporated herein by reference. In addition, my U.S. patent application Ser. No. 09/318,428, filed May 25, 1999 and entitled AXLELESS VEHICLE SUSPENSION SYSTEM is further incorporated herein by reference.

BACKGROUND OF THE INVENTION

Truck trailers carry a significant volume of cargo over the nation's roads. Some of that cargo is fragile or vulnerable to vibration and shaking. Unfortunately, some highways and roads are in a deteriorated state and include numerous potholes and cracks. Some highways have pronounced joints and cracks. These deteriorated roads are a threat to movement of fragile cargo.

There are numerous approaches for isolating fragile cargo from roadway disturbances. Some of these approaches include careful packaging of the cargo, use of vibration isolation systems within the trailer, and even modifying the design of the cargo items to make them more rugged. Yet another approach includes modifying the suspension system of the truck trailer to make the trailer less vulnerable to the vibration and pitching movements caused by roadway disturbances. Unfortunately, some of these systems are complex and expensive, and in some cases require specially designed trailers.

What is needed is a suspension system that provides an improved ride while overcoming disadvantages of existing systems. The present invention does this in a novel and unobvious way.

SUMMARY OF THE INVENTION

In one aspect of the current invention there is a wheel suspension system for supporting a vehicle from a roadway. The system comprises a vehicle frame with two opposing sides, the frame having a longitudinal axis. A first wheel supports the frame from a roadway from a first side of the frame, the first wheel being rotatably supported about a first rotational axis by a first stub axle pivotally coupled to the frame by a first pivot joint located inboard of the first wheel. There is also a second wheel supporting the frame from the roadway from the other, opposing side of the frame. The second wheel is rotatably supported about a second rotational axis by a second stub axle pivotally coupled to the frame by a second pivot joint located inboard of the second wheel. The first rotational axis is not coincident with the rotational axis of any other sub axle of the vehicle. The second rotational axis is not coincident with the rotational axis of any other stub axle of the vehicle.

These and other aspects of the invention will be apparent from the description, claims, and drawings to follow.

DESCRIPTION OF THE PREFERRED EMBODIMENTS

Figure 1:
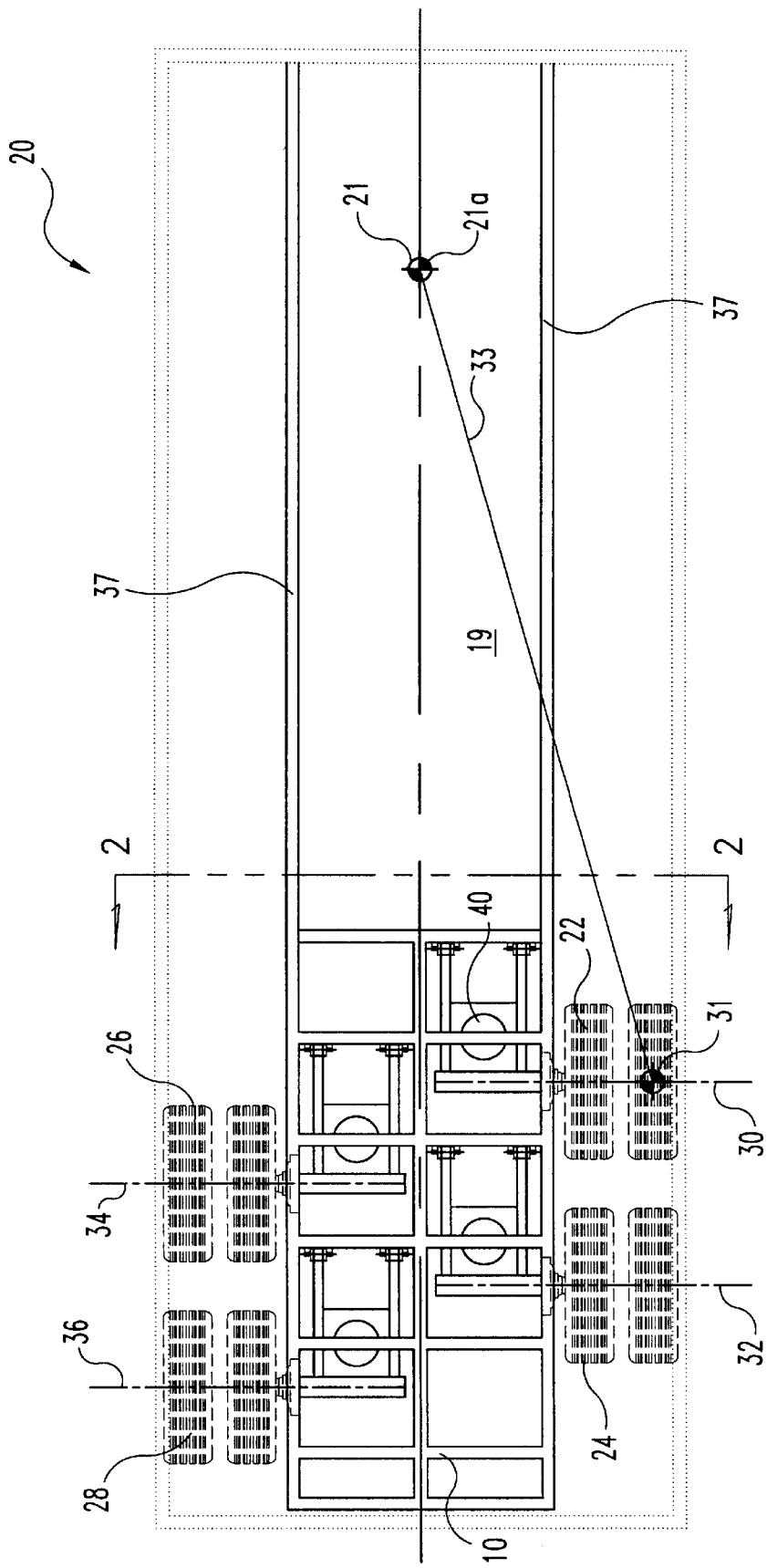
FIG. 1 is a top view of one embodiment of the present invention, with portions of the truck trailer removed and other portions shown schematically.

For the purposes of promoting an understanding of the principles of the invention, reference will now be made to the embodiments illustrated in the drawings and specific language will be used to describe the same. It will nevertheless be understood that no limitation of the scope of the inventions is thereby intended, such alterations and further modifications in the illustrated devices, and such further applications of the principles of the inventions as illustrated therein are contemplated as would normally occur to one skilled in the art to which the inventions relate.

The present invention relates to a wheel suspension system for a vehicle in which at least some of the wheels on one side of the vehicle have rotational axes that are longitudinally spaced apart, or staggered, from the rotational axes of wheels on the other side of the vehicle. In one embodiment, a wheel suspension system according to the present invention provides rolling support for a cargo-carrying trailer pulled by a powered truck cab. However, the present invention also contemplates staggered wheel suspension systems for buses, vans, and other vehicles.

In one preferred embodiment of the present invention, the wheel suspension system includes four pairs of wheels, with each pair of wheels being rotatably supported by a stub axle coupled to a wheel support pivotally attached to a sub-frame. Preferably, the wheels are not powered by the vehicle motor, nor do they articulate for purposes of steering. The sub-frame is slidingly received on the bottom of the aft end of a trailer, the forward end of the trailer including a conventional kingpin for coupling to a truck cab. In this embodiment, the wheel suspension system as mounted on a sub-frame is thus a module which can be coupled to different trailers, and which can also be coupled at different positions along the length of the trailer so as to achieve proper weight distribution on the wheels. The attachment of the wheel supports to a sub-frame permits the use of this sub-frame on a truck trailer that incorporates the necessary couplings. In one embodiment the sub-frame is arranged and constructed to couple to channel sections located underneath the trailer floor. The sub-frame can be slidingly positioned along the length of the channel section so as to achieve proper weight balance for the trailer wheels.

By mounting the suspension system to a sub-frame as shown and described, the present invention is particularly useful on existing truck trailers. A suspension module according to the present invention maintains the floor of the truck trailer at about the same vertical height as a present suspension system. Therefore, the floor of the truck trailer is at a height compatible with loading docks and various equipment designed to work with a standard height trailer floor. Thus, a "high profile" suspension system according to the present invention maintains compatibility with many hundreds of thousands of truck trailers.

In some embodiments of the present invention, the wheel supports are pivotally attached to a static member of the sub-frame, such that the pivotal motion of the wheels and wheel supports occur with a single degree of freedom relative to the vehicle. However, the present invention also contemplates those embodiments in which the wheel supports are pivotally coupled to a pivotal member, with the pivotal member being pivotally coupled to the sub-frame or the vehicle. In this alternate embodiment, the wheel and wheel support pivot relative to the vehicle with two degrees of freedom.

Although a wheel suspension system with a sub-frame and four pairs of wheels has been described, the present invention also contemplates as few as two pairs of wheels and as many as six or more pairs of wheels, including odd numbers of pairs of wheels, and also wheel supports that support a single wheel instead of a pair of wheels. Further, the present invention also contemplates those embodiments in which the wheel supports are pivotally supported from the frame of the vehicle, and not from a separable and slidingly locatable sub-frame. In addition, the present invention further contemplates usage on vehicles including buses, vans, and trucks including pick-up trucks.

In one embodiment of the present invention, the rotational axes of the wheels on one side of the vehicle are arranged to be non-coincident with the rotational axes of the wheels on the other side of the vehicle, and preferably including at least one rotational axis on one side of the vehicle which is in between two rotational axes of wheels on the other side of the vehicle. This longitudinal spacing apart of opposite side rotational axes provides a smoother ride for the cargo carried by the vehicle. For example, a bump or depression spanning the width of the roadway moves only one wheel support at any given moment. Further, each wheel support is mechanically independent of every other wheel support, unlike suspension systems using a through axle, in which a roadway disturbance passing along a single side of the vehicle nonetheless transmits a force onto the other side of the vehicle. Similarly, a lateral disturbance on one side of the roadway will affect only a single wheel or pair of wheels on one side of the vehicle, and not the wheels on the other side of the vehicle. The present invention therefore provides a generally lower degree of disturbance into the cargo carried by the vehicle. Staggering of the wheel rotational axes also results in less pitching motion of the vehicle.

In some embodiments of the present invention, the extent of stagger between opposite side wheels is about half the distance between rotational axes of same-side wheels. However, the present invention also includes those embodiments with different amounts of stagger.

Some embodiments of the present invention contemplate an even total number of rotational axes being arranged on both sides of the vehicle in an alternating longitudinal pattern, with no rotational axis being coincident with any other rotational axis. The present invention contemplates not only embodiments in which there is a forward-most wheel on the right side of the vehicle with an aft-most wheel on the left side, but also embodiments in which the forward-most wheel is located on the left side and the aft-most wheel is located on the right side. Further, the present invention also contemplates those embodiments in which both the forward-most and aft-most wheels are on the same side of the vehicle, and also those embodiments in which one side of the vehicle is supported by an even number of wheels and the other side of the vehicle is supported by an odd number of wheels, such as by way of example, a vehicle with two wheels on one side and one wheel on the other side. Further, the total number of rotational axes per frame section is as low as two, and is as great as required in the particular application.

In another embodiment of the present invention, each of the wheel supports has an air spring to bias that wheel support to a position intermediate of an uppermost position and lowermost position. In another embodiment of the present invention, the air pressure within each air spring is controlled by an electronic controller. The controller places a source of compressed air in fluid communication with an air spring in response to movement of a wheel support, or in response to some other vehicle sensor, such as one or more ride-height sensors or one or more motion sensors, such as accelerometers. For example, the controller may adjust the air pressure within one or more air springs to maintain a particular height of the vehicle floor above the roadway. In another embodiment, as the vehicle turns a corner, the controller may reduce the air pressure in those air springs located along the inside of the turn and/or increase the pressure in those air springs along the outside of the turn.

In another embodiment of the present invention, the wheel support is fabricated from various readily available components so as to lower the manufacturing cost and increase the repairability of the wheel suspension system. For example, the short stub axle is preferably fabricated from a portion of a conventional through-axle in one embodiment of the present invention. This cut-off portion of a conventional axle is welded to a pair of pivot arms and an air spring support, and can thus support a conventional spindle, bearings, and wheels with minimal modification.

As used herein, the term outboard refers to a position located further away from the longitudinal centerline of the vehicle, and the term inboard refers to something located closer to the longitudinal centerline of the vehicle. Further, the terms longitudinal, lateral, and vertical have their usual meaning, such that a longitudinal axis extends along the vehicle in the direction of travel of the vehicle, a vertical axis extends vertically upward from the roadway surface, and a lateral axis extends perpendicularly to both the longitudinal and vertical axes. As is further customary, the terms roll, pitch, and yaw refer to rotational movements about the longitudinal, lateral, and vertical axes, respectively. Reference herein may be made to a single wheel support and supported wheel, but it is understood that such description applies to other wheel supports referred to or depicted.

FIG. 1 shows a top view of an apparatus 20 according to one embodiment of the present invention. Apparatus 20 includes a wheel suspension system 10 coupled toward the aft end of a trailer 19. The front end of trailer 19 includes a king pin 21 which pivotally couples trailer 19 to a truck cab (not shown), the truck cab providing power to pull trailer 19 over a roadway. Portions of trailer 19 have been removed or are shown in phantom lines for sake of clarity. Wheel suspension system 10 includes a first pair of wheels 22 and a second pair of wheels 24, both located on one side of trailer 19, and a third pair of wheels 26 and a fourth pair of wheels 28, located on the opposite side of trailer 19. Wheel pairs 22, 24, 26, and 28 rotate about rotational axes 30, 32, 34, and 36, respectively. Wheel pairs 22 and 24 support sub-frame 38 and vehicle 19 from the roadway on one side of sub-frame 38, and wheel pairs 26 and 28 support sub-frame 38 and vehicle 19 from the roadway on the other side of sub-frame 38. In a preferred embodiment, none of the rotational axes 30, 32, 34, or 36, are coincident with any other rotational axis. Rotational axis 34 is longitudinally spaced between rotational axes 30 and 32, and rotational axis 32 is longitudinally spaced between rotational axes 34 and 36.

Figure 2:
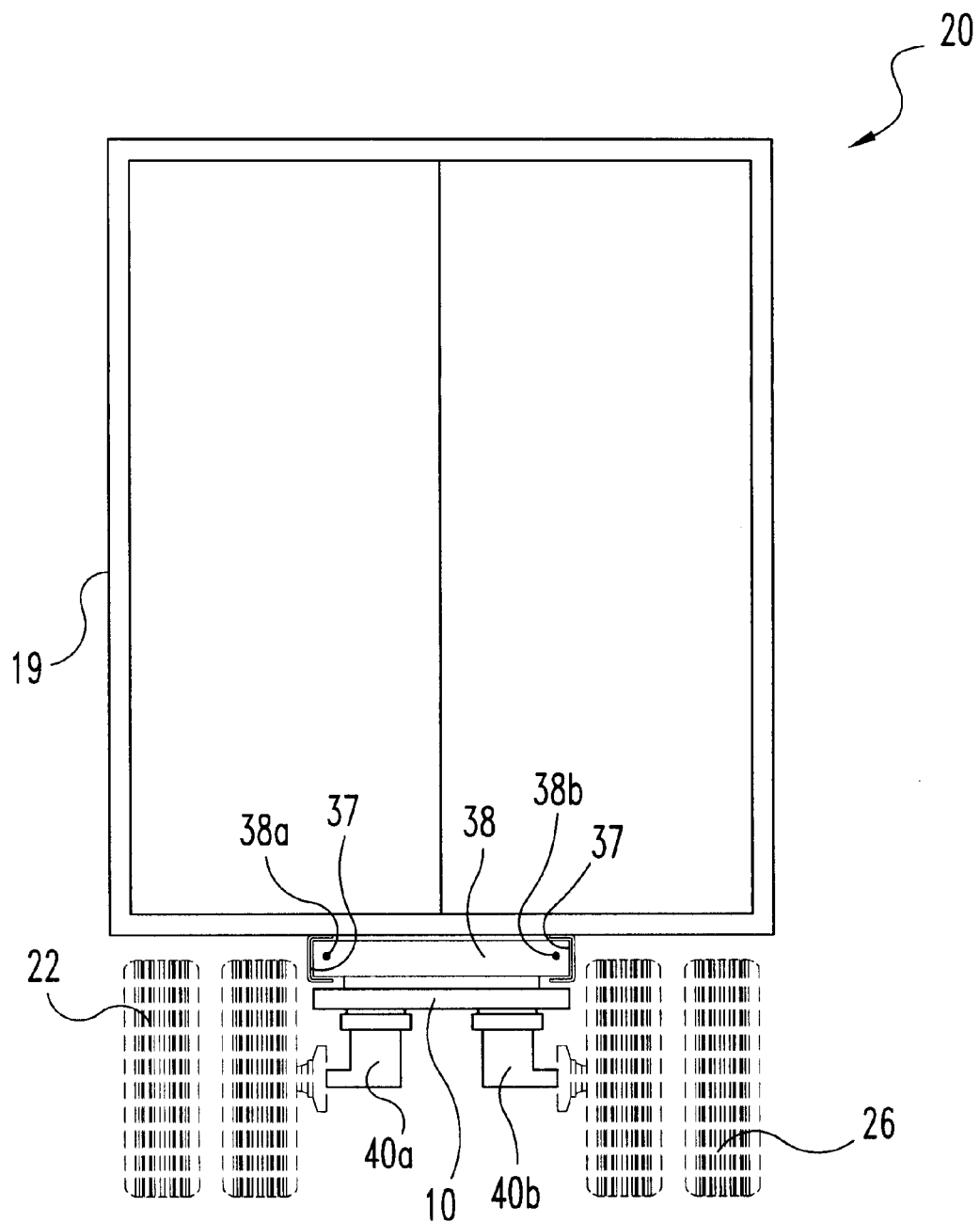
FIG. 2 is a view of the embodiment of FIG. 1 as taken along line 2—2 of FIG. 1.

FIG. 2 is a view of apparatus 20 as taken along line 2—2 of FIG. 1. Wheel suspension system 10 is shown with one mode of coupling to trailer 19. In this embodiment of the present invention, trailer 19 includes a pair of channel sections 37 attached to the bottom of trailer 19, and running generally along the length of trailer 19. Wheel suspension system 10 includes a sub-frame 38, which is slidingly received between channels 37. As seen in FIG. 2, sub-frame 38 includes lateral portions 38a and 38b adapted and configured to have a shape and spacing complementary to the shape and spacing of channels 37. Channels 37 permit longitudinal sliding of sub-frame 38 relative to trailer 19, but limit relative lateral motion. Wheel pairs 22 and 26 are pivotally coupled to sub-frame 38 by right wheel support 40a and left wheel support 40b. Right wheel support 40a and left wheel support 40b are preferably mirror images of each other. Although what is shown and described are pairs of wheels and tires pivotally supported by a wheel support, it is understood that the present invention also includes a single wheel and tire, or multiple wheels and tires, supported by each wheel support.

Figure 3:
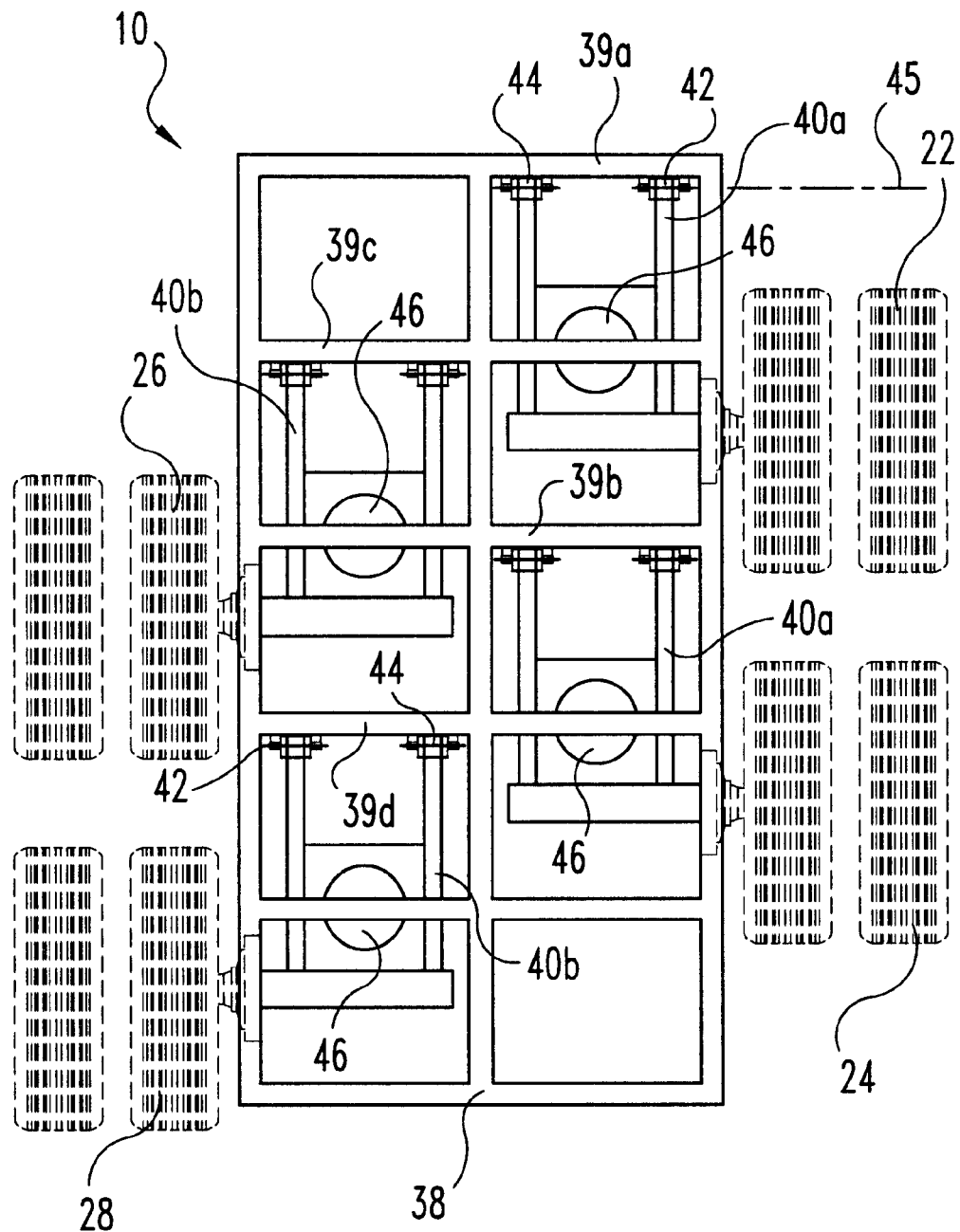
FIG. 3 is a top view of the embodiment of FIG. 1.

FIG. 3 is a top view of wheel suspension system 10 not coupled to a trailer or other vehicle. Each pair of right hand wheels 22 and 24 are pivotally coupled to static member 39a and 39b, respectively, of sub-frame 38 each by a right hand wheel support 40a. Likewise, each pair of left hand wheels 26 and 28 are pivotally coupled to static members 39c and 39d, respectively, of sub-frame 38 each by a left hand wheel support 40b. Static members 39a, 39b, 39c, and 39d are portions of sub-frame 38, or in an alternative embodiment, portions of the vehicle frame. Each wheel support is pivotally coupled to sub-frame 38 by an inner pivot assembly 44 and an outer pivot assembly 42, and are pivotal about a laterally disposed pivot axis such as pivot axis 45. Examples of pivot assemblies are shown in U.S. patent application Ser. No. 09/318,428, filed May 25, 1999, and incorporated herein by reference. Preferably, the pivot axis of a wheel support is parallel to the rotational axis of the wheel supported by that same wheel support. In one embodiment of the present invention, each wheel support is pivotally coupled such that it pivots with pitching motion relative to the vehicle, and is substantially constrained from yawing motion, such as the yawing motion required for steering.

It is believed that the smooth ride provided by a suspension according to the present invention is a result of both the staggering of the rear wheels and also a pivoting effect from the motion of the pivot arms. As best seen by referring to FIG. 1, each wheel supporting the trailer is in contact with the roadway at point 31, where the roadway exerts both a longitudinal force on the tire and also a vertical force on the tire. These roadway forces create a torque about kingpin 21, which is pivotal about vertical axis 21a. These forces act through a moment arm 33 between kingpin 21 and roadway contact point 31. As the pivoting arm pitches up and down, the length of the moment arm 33 changes, and it is believed that the change in the moment arm length contributes to a smoother ride for the contents of the trailer.

Although a pivoting arm suspension has been shown and described, the present suspension also contemplates those embodiments in which the rotational axes of the rear wheels on one side are not coincident with the rotational axes of the rear wheels of the other side, and in which the stub axles supporting the rear wheels do not pivot in a pitching direction, but instead are constrained by the suspension system to translate in the vertical direction. As one example, a suspension system according to this alternate embodiment constrains the stub axles to vertical motion with a slidable guiding member of the stub axle that translates within a vertical channel, the vertical channel being statically mounted to the frame. As another example, the stub axle is attached to the frame by both a leading arm and a trailing arm which include features that result in essentially vertical motion of the stub axle.

Suspension system 10 further includes an air spring 46 for biasing each wheel support from sub-frame 38. One end of air spring 46 is in contact with a spring support face of the wheel support, and the other end of air spring 46 is in contact with a cross member or other structural member of sub-frame 38. Air spring 46 is located intermediate of the pivot axis of the particular wheel support and the rotational axis of the supported wheel. Although a suspension system including air springs has been shown and described, the present invention also contemplates other types of springs for urging the wheel support apart from the sub-frame, including by way of example coil springs and leaf springs. Although sub-frame 38 is shown in FIG. 3 as a ladder-type frame of cross members and longitudinal members, those of ordinary skill in the art will recognize other arrangements of sub-frame 38 suitable for transmitting vehicle loads to the roadway.

Preferably, the wheel supports of the present invention are each mechanically independent of each other. The motion of one wheel support is not mechanically linked to the motion of any other wheel support. For example, a small bump in the roadway which passes underneath only a single wheel on one side of the vehicle causes movement only to the wheel support for that wheel and no other wheel support, except of course as those other wheel supports may be affected by resultant movement of the vehicle itself. This mechanical independence cannot be achieved in other suspension systems which utilize axles spanning the width of the vehicle and supporting wheels on either end, in which case the axle mechanically ties the motion of one wheel support to the motion of another wheel support. Further, mechanical independence of one wheel support relative to another wheel support cannot be achieved in other designs where two or more wheel supports are linked together, for example, by common gears, common springs, or, common shock absorbers. However, the present invention also contemplates those embodiments in which there is mechanical coupling of wheel supports, for example by common gears, common springs, or common shock absorbers.

Figure 4:
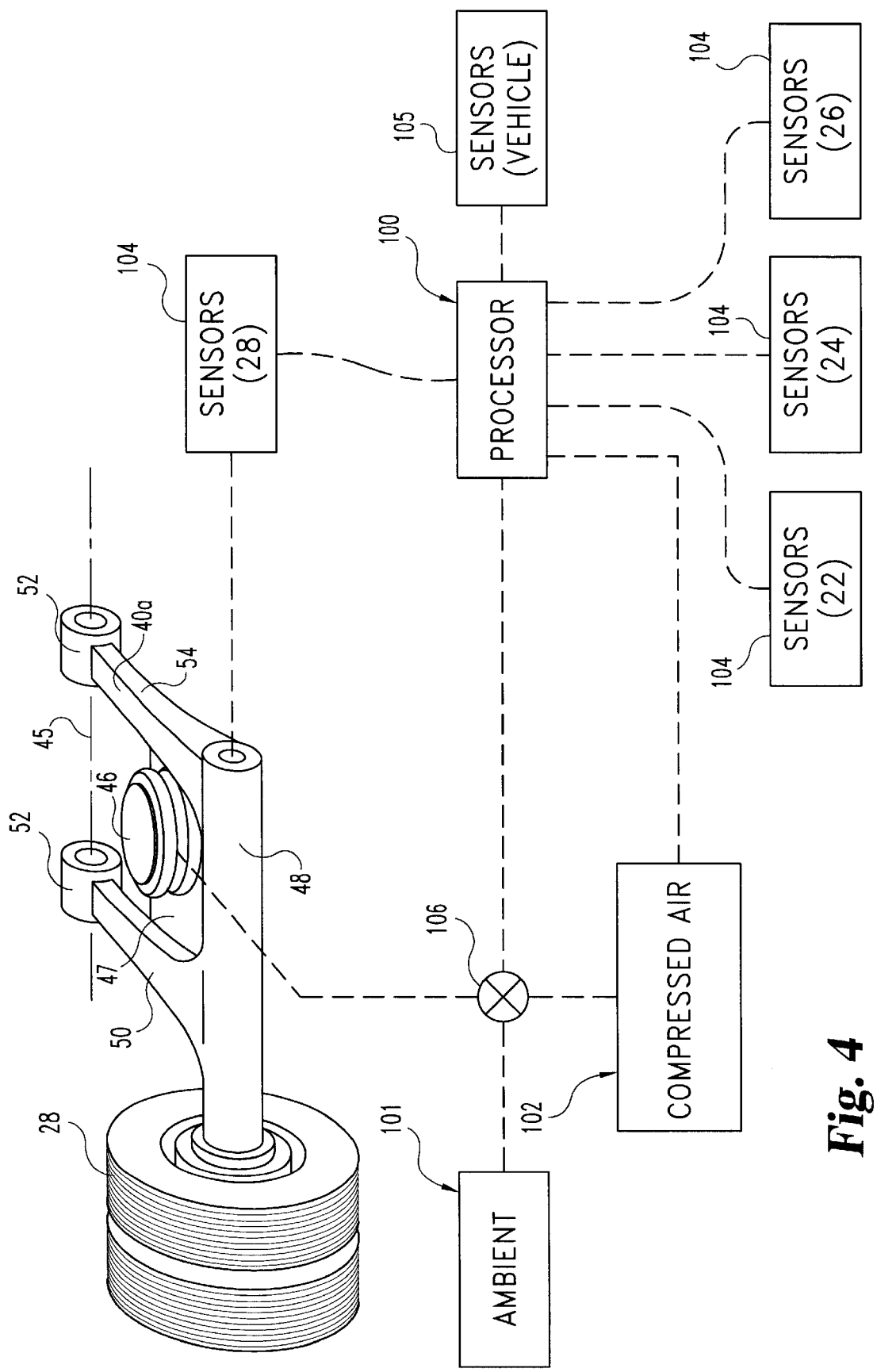
FIG. 4 is a schematic representation of another embodiment of the present invention.

FIG. 4 is a schematic representation of a control system, a single pair of wheels 28, and a single wheel support according to one embodiment of the present invention, it being understood that the control system is capable of controlling multiple supported wheels. Wheel support 40a includes a stub axle 48 coupled to an outer arm 50 and an inner arm 54. Stub axle 48 is preferably a portion of a through-axle, and supports, at its outer end, a spindle which in turn supports wheel pair 28. Stub axle 48 does not span the width of the sub-frame and does couple to wheels which support the sub-frame. Stub axle 48 does not couple to wheels which support the sub-frame from the other side of the vehicle. Wheel pair 28 is supported in cantilever manner by stub axle 48.

Preferably, a wheel support according to the present invention supports a stub axle, and the stub axle supports one or more wheels from a single side in cantilever manner such that the wheel is located outboard of the wheel support, leaving the space inboard of the wheel and stub axle for the wheel support. In another embodiment of the present invention, a stub axle supports a wheel in cantilever manner wherein the stub axle is constrained from pivotal motion. In this embodiment the wheel is located at an outboard position, the stub axle is located inboard of the supported wheel, and a translatable member which couples the stub axle to the frame is located inboard of the stub axle. The coupling of the translatable member to the stub axle includes one or more springs for urging the translatable member and stub axle apart from the frame. The term cantilever describes one or more wheels which are supported on a single side of the stub axle, with the other side of the stub axle coupling to a wheel support, translatable member, or other member not including a wheel.

In one embodiment of the present invention, arms 50 and 54 are welded to stub axle 48. The other ends of arms 50 and 54 include pivot joints 52, which couple to one of the mating pivot assemblies 42 or 44 of the sub-frame. Arms 50 and 54 and pivot assemblies 42 and 44 are preferably laterally spaced apart where the arms pivotally couple to the frame so as to provide lateral stability to and prevent lateral motion of the supported wheels.

Although a wheel support with laterally spaced apart arms and pivot assemblies has been shown and described, the present invention also contemplates a wheel support in which the pair of arms are spaced apart at their pivotal end, but which come together at their ends located near the stub axle. Also contemplated by the present invention are wheel supports that are welded, cast, forged, molded, or made by any manufacturing method. Further, the present invention includes embodiments in which the stub axle is bolted to the wheel support or integral with the wheel support.

Pivot joints 52 are located inboard of wheel pair 28. Pivot joints 52 permit pitching motion of wheel support 48 about a pivot axis 45. In one embodiment, the pivot axes of the wheel supports, and also the wheels and stub axles, are located beneath the floor of the vehicle. Preferably, the pivotal attachment of the wheel support to the frame permits pivotal motion about a single degree of freedom, such as pitching motion. The pivotal attachment of the wheel support preferably precludes yawing motion such as the pivotal motion necessary for steering.

A spring support 47 contacts and supports one end of air spring 46, and transmits vehicle loads through the air spring to stub axle 48. One embodiment of the present invention includes a control system for changing the air pressure in the air springs. The control system includes a processor 100 which receives input data from sensors 104 and sensors 105. Processor 100 is preferably a digital controller including a CPU, memory, and various hardware interfaces including D/A and A/D interfaces. However, the present invention also contemplates a processor which is primarily analog in nature.

Sensors 104 include a sensor at each wheel 22, 24, 26, and 28 to sense the position of the wheel support coupled to the particular wheel. In one embodiment, sensors 104 include a displacement sensor for sensing, for example, the distance from a wheel support to the sub-frame or the angular position of a wheel support relative to the sub-frame. In another embodiment, sensors 104 include an air pressure sensor for sensing the air pressure in the air spring 46 which biases the particular wheel. Sensors 105 include data received from vehicle sensors, or other sensors which can be incorporated into wheel suspension system 10, for data such as vehicle speed or the acceleration of the trailer along any of the six degrees of freedom, for example. Sensors 105 may also include data from the vehicle anti-lock braking system (ABS), indicating whether or not braking force is being applied.

Processor 100 preferably controls both a source of compressed air 102 and one or more valves 106 for placing the source of compressed air in fluid communication with air springs 46. In one embodiment of the present invention, each air spring 46 is coupled to an individual valve 106. Processor 100 actuates valve 106 so as to place air spring 46 in fluid communication with compressed air source 102, or to place air spring 46 in fluid communication with ambient for purposes of venting.

Figure 5:
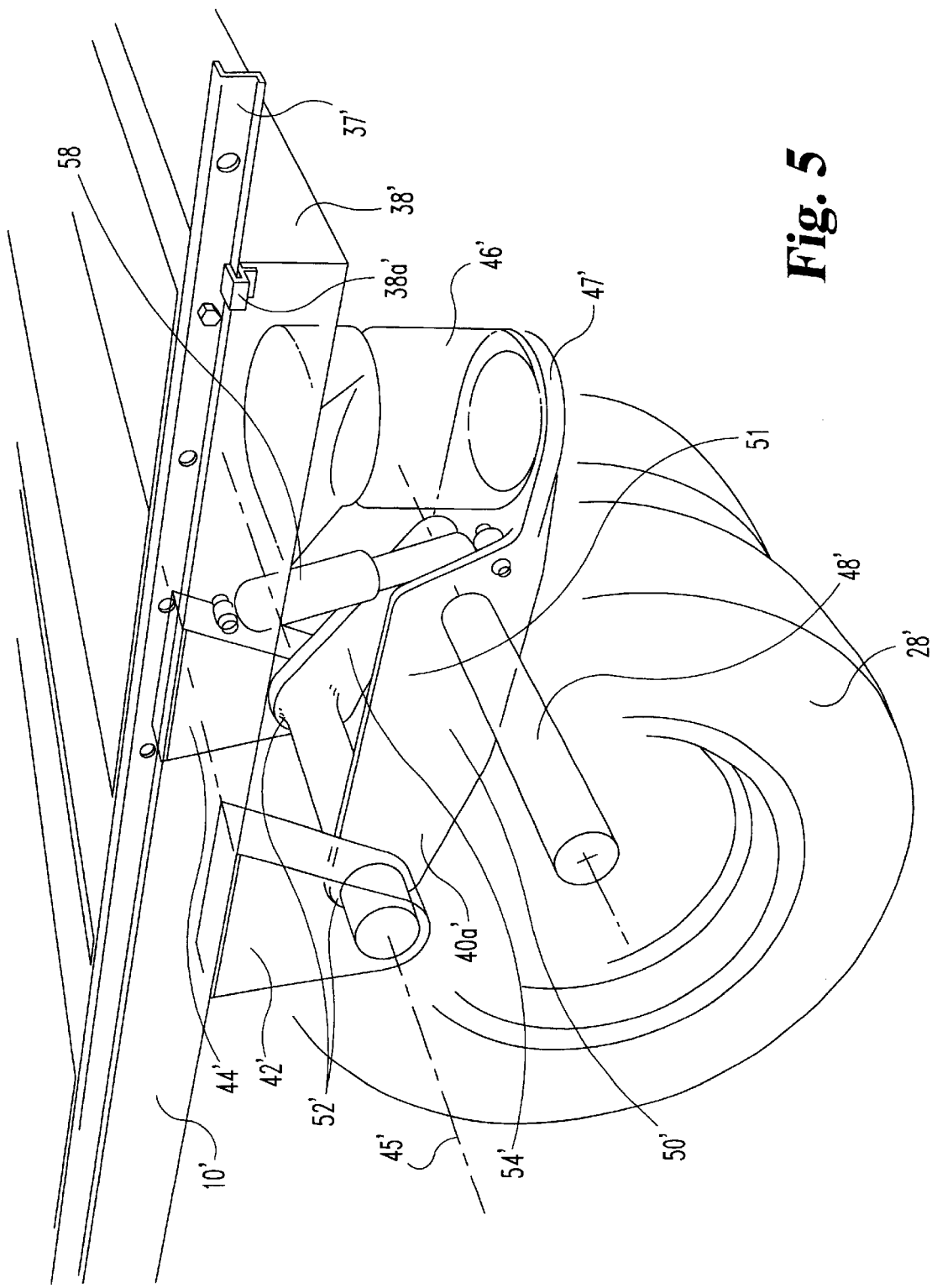
FIG. 5 is a schematic perspective view from above of another embodiment of the present invention.
Figure 6:
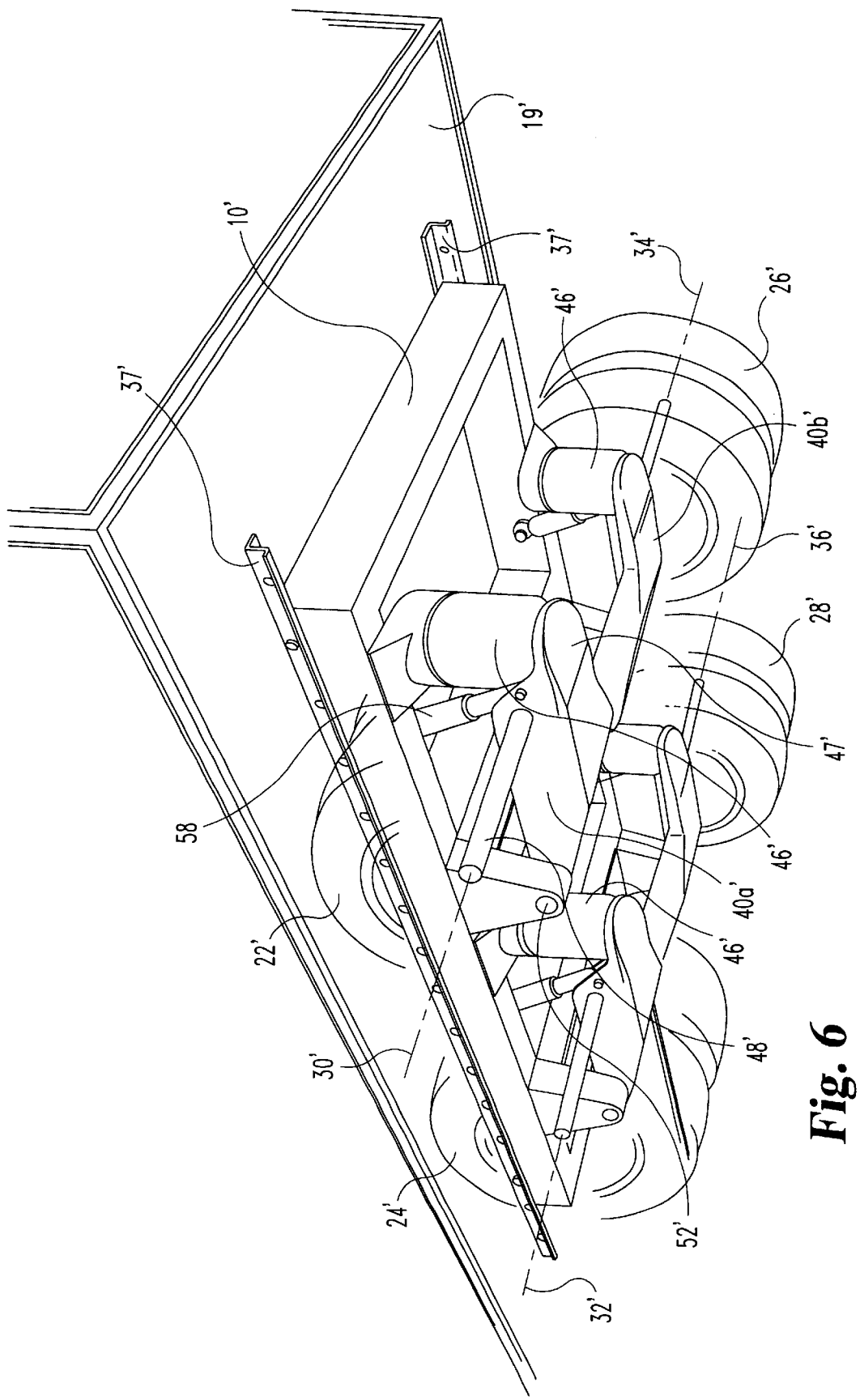
FIG. 6 is a schematic perspective representation from below of the embodiment of FIG. 5.

FIGS. 5 and 6 present top and bottom perspective views, respectively, of another embodiment of the present invention. The use of numbers with a prime (') designation indicates components that are substantially identical to those previously disclosed, except as disclosed differently hereafter and depicted differently in FIGS. 5 and 6. In one embodiment of the present invention, wheel suspension system 10' includes a shock absorber 58 for each wheel support. Shock absorber 58 is pivotally coupled at one end to a wheel support, and pivotally coupled at the other end to sub-frame 38'. Sub-frame 38' includes members 38a' adapted and configured to have a shape and spacing complementary to a portion of the shape and spacing of channels 37', as best seen in FIG. 5. Channels 37' permit longitudinal sliding of sub-frame 38' relative to trailer 19, but limit relative lateral motion. Arm 50' preferably includes a vertical wall section 51 which extends from outer pivot 52 toward air spring 46', and including support for stub axle 48'. Vertical support number 51 increases the bending stiffness of wheel support 40a'. Stub axle 48' is located at a point intermediate of the longitudinal distance between air spring 46' and pivot couplings 52'. Spring support portion 47' of wheel support 40a' extends rearward from stub axle 48'. Pivot couplings 52 and 52' permit pivoting of a wheel support about an axis that is substantially parallel to the rotational axes of the supported wheels.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A wheel suspension system for a vehicle, comprising:
   a vehicle frame with two opposing sides, said frame including a first static portion and a second static portion;
   a first wheel supporting said frame from a roadway, said first wheel being located on a first opposing side of said frame, said first wheel being rotatably supported about a first rotational axis by a first stub axle coupled to a first wheel support, said first wheel support being pivotally coupled to the first static portion about a first pivot axis and said first pivot axis being above said first rotational axis;
   a second wheel supporting said frame from the roadway, said second wheel being located on the second opposing side of said frame, said second wheel being rotatably supported about a second rotational axis by a second stub axle coupled to a second wheel support, said second rotational axis being spaced apart longitudinally from said first rotational axis, said second wheel support being pivotally coupled to the second static portion about a second pivot axis and said second pivot axis being above said second rotational axis;

a first spring for biasing said wheel support from said frame, said first spring having an end in contact with said first wheel support; and a second spring for biasing said wheel support from said frame, said second spring having an end in contact with said second wheel support;

wherein said first rotational axis is not coincident with the rotational axis of any wheel supporting the vehicle from the second opposing side of said frame, and said second rotational axis is not coincident with the rotational axis of any wheel supporting the vehicle from the first opposing side of said frame, wherein said first wheel support is pivotally coupled to said frame by a first pair of pivot joints spaced laterally apart from each other and located inboard of first wheel, and said second wheel support is pivotally coupled to said frame by a second pair of pivot joints spaced laterally apart from each other and located inboard of said second wheel;

wherein said first wheel support includes a first spring support located laterally between said pivot joints of said first pair of pivot joints, and said second wheel support includes a second spring support located laterally between said pivot joints of said second pair of pivot joints.

2. The wheel suspension system in claim 1 wherein each said first wheel support and said second wheel support move independently of each other.

3. The wheel suspension system in claim 2 wherein said first wheel support is pivotally coupled to said frame forward of the rotational axis of said first wheel, and said second wheel support is pivotally coupled to said frame forward of the rotational axis of said second wheel.

4. The wheel suspension system in claim 3 wherein neither said first wheel nor said second wheel are powered to rotate.

5. The wheel suspension system in claim 4 wherein said first wheel is constrained from pivoting to steer the vehicle and said second wheel is constrained from pivoting to steer the vehicle.

6. The wheel suspension system in claim 1 wherein said first wheel support is pivotally coupled to said frame forward of the rotational axis of said first wheel, and said second wheel support is pivotally coupled to said frame forward of the rotational axis of said second wheel.

7. The wheel suspension system in claim 1 wherein neither said first wheel nor said second wheel are powered to rotate.

8. The wheel suspension system in claim 1 wherein said first wheel is constrained from pivoting to steer the vehicle and said second wheel is constrained from pivoting to steer the vehicle.

9. The wheel suspension system in claim 1 wherein said vehicle has a floor, and the floor is above said first rotational axis and said second rotational axis.

10. The wheel suspension system of claim 1 wherein said first pivot axis is parallel to said first rotational axis, and said second pivot axis is parallel to said second rotational axis.

11. The wheel suspension module of claim 10 wherein said first wheel support is pivotally coupled to said vehicle frame by a first pivot joint located inboard of said first wheel and said second wheel support is pivotally coupled to said vehicle frame by a second pivot joint located inboard of said second wheel.

12. The wheel suspension system of claim 11 wherein said first wheel and said second wheel are rear wheels for a truck trailer.

13. The wheel suspension system of claim 1 which further comprises:

a third wheel supporting said frame from a roadway, said third wheel being located on the first opposing side of said frame, said third wheel being rotatably supported about a third rotational axis by a third stub axle coupled to a third wheel support, said third wheel support being pivotally coupled to said vehicle frame about a third pivot axis; and a fourth wheel supporting said frame from the roadway, said fourth wheel being located on the second opposing side of said frame, said fourth wheel being rotatably supported about a fourth rotational axis by a fourth stub axle coupled to a fourth wheel support, said fourth wheel support being pivotally coupled to said vehicle frame about a fourth pivot axis;

wherein said third rotational axis is not coincident with the rotational axis of any wheel supporting the vehicle from the second opposing side of said frame, said fourth rotational axis is not coincident with the rotational axis of any wheel supporting the vehicle from the first opposing side of said frame, and the first rotational axis is spaced longitudinally in front of said second and fourth rotational axes, and the third rotational axis is spaced longitudinally between said second and fourth rotational axes.

14. The wheel suspension system of claim 1 wherein said vehicle frame is a sub-frame, said sub-frame being adapted and configured to slidingly couple to the bottom of a substantially planar floor of a vehicle.

15. The wheel suspension module of claim 1 wherein said first wheel support and said second wheel support are trailing arm wheel supports.

* * * * *